Jan. 12, 1926.

L. B. MacKENZIE 1,569,097

SPHYGMOMANOMETER

Filed August 10, 1923

INVENTOR
Luther B. MacKenzie
BY
ATTORNEYS.

Patented Jan. 12, 1926.

1,569,097

UNITED STATES PATENT OFFICE.

LUTHER B. MacKENZIE, OF NEW YORK, N. Y.

SPHYGMOMANOMETER.

Application filed August 10, 1923. Serial No. 656,698.

*To all whom it may concern:*

Be it known that I, LUTHER B. MACKENZIE, a citizen of Canada, and a resident of New York city, borough of Manhattan, in the county and State of New York, have invented certain new and useful Improvements in Sphygmomanometers, of which the following is a specification.

My invention relates in an improvement in sphygmomanometers, and one of the objects thereof is the provision in such an instrument of a column of mercury which is pumped through a tube against a cushion of air, means being provided for ensuring accuracy at all times in the taking of blood pressures.

A further object of the invention is the provision of a sphygmomanometer wherein the indicating material is pumped in the form of a column through a glass tube toward the normally closed end thereof, means being provided, however, for opening the closed end of the tube when necessary, prior to the taking of the blood pressure, to equalize the pressure in the tube, thereby balancing the indicating material to compensate for any unbalanced condition from atmospheric or other causes.

A still further object of the invention is to provide the sphygmomanometer with a glass tube wound in the form of a spiral, the convolutions of the spiral lying in the same plane, so as to produce an instrument of minimum size yet capable of indicating all desired pressures.

A further object of the invention is to provide the end of the tube remote from the well or reservoir for the mercury with an enlarged air chamber, which enables the calibrations of the instrument to be sufficiently spaced to permit of easy reading at all times without necessitating undue lengthening of the tube.

In general I have provided a spirally wound glass tube, the convolutions of which all lie in the same plane, having a normally closed end, the open end of the tube being provided with a reservoir for the mercury or other indicating material employed. The reservoir end of the tube is connected to an air chamber by which the mercury, which is normally lodged in the reservoir, is forced through the tube in the form of a column. The mercury column, when the instrument is in use, is forced through the horizontally disposed convolutions of the spirally wound tube, these convolutions lying in a different plane from that of the reservoir.

When the instrument is in use, it is held so that the convolutions of the spiral lie in a horizontal plane, and in order that the mercury in the reservoir may take the same level initially as that portion of the mercury which extends into the tube, it being understood that initially the mercury not only lies in the reservoir but also extends a short distance into the tube, I provide means for initially equalizing the pressure on each side of the mercury. In other words, before the pump is operated to force the mercury in the form of a column along the glass tube, the pressure at each side of the mercury should be atmospheric, in order that the mercury may take its proper position in the instrument, and to this end, therefore, I have provided a valve in the normally closed end of the tube which is adapted to be opened to permit of the pressure in the tube ahead of the mercury to be equalized with the pressure behind the mercury. This arrangement permits of accurate operation of the instrument.

As above noted, the normally closed end of the tube is provided with a bulb or enlarged portion for the purpose of increasing the volume of air confined in the tube ahead of the mercury column, this arrangement enabling the calibrations of the instrument to be spaced sufficiently so as to be easily read without the necessity of unduly lengthening the tube.

In the accompanying drawings—

Figure 1:
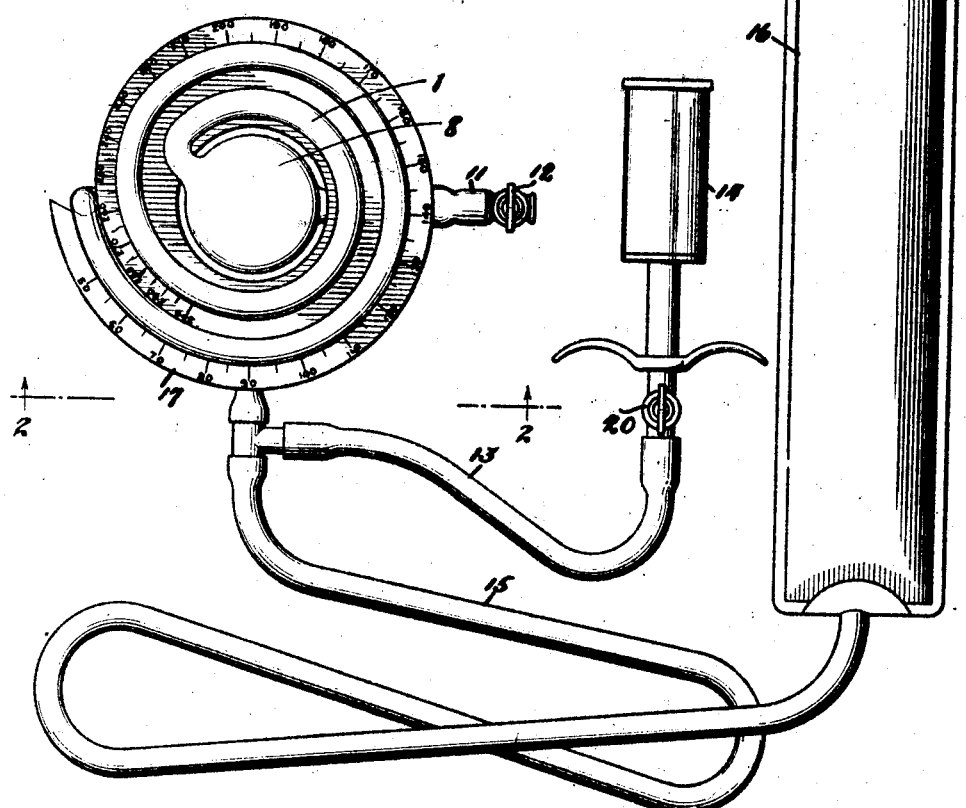
Figure 1 illustrates an embodiment of my invention in plan.

Referring to the drawings in detail, 1 designates a spirally wound glass tube normally closed at one end, the convolutions of the spiral all lying in the same plane. The open end of the tube is bent substantially at right angles to the plane of the spiral, as indicated at 2, and then inwardly toward the center of the spiral, as indicated at 3, where it is enlarged to provide a reservoir 4 for the indicating material, which may be mercury, for example, and which is designated 5, the reservoir lying in a different plane from that of the plane of the spiral. The reservoir 4 is provided with a nipple 6 and a pipette 7, which is so shaped that the mercury contained within the reservoir cannot spill out, no matter what position the instrument may be held in, or get into the pipette by capillarity.

Figure 3:
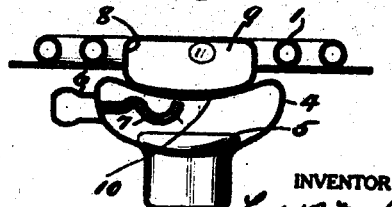
Figure 3 is a section through Fig. 2 substantially on the line 3—3 thereof.

The normally closed end of the tube is at the center of the spiral and overlies the reservoir 4. This end of the tube is somewhat enlarged to form a bulb 8, thereby providing an enlarged air chamber, designated 9, the bottom of this chamber lying in the depressed or concaved upper wall 10 of the reservoir, as plainly indicated in Fig. 3, this construction materially reducing the depth of the instrument.

The normally closed end of the tube is also provided with a balance tube or nipple 11 having a valve 12 adapted to be operated to balance the mercury, as will hereinafter be pointed out.

The mercury or other indicating material is forced through the tube 1 by means of a pump 14, the tube 13 of which is attached to the nipple 6 and and also to a tube 15 connected to a pneumatic bag or tourniquet 16.

The scale 17 for the instrument may be etched directly on the tube itself, if desired, or, as indicated in the drawings, may be separately attached to the tube.

Figure 2:
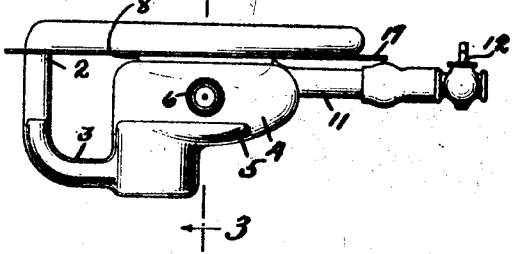
Figure 2 is a section taken substantially on the line 2—2 of Fig. 1.

In operation, the instrument is held in the position shown in Fig. 2—that is to say, with the convolutions of the spiral lying in a horizontal plane and with the reservoir 4 lying directly beneath the enlarged portion 8 of the normally closed end of the tube. If the mercury is in balance at this time, the end of the mercury which extends a short distance into the lower part of the tube will take the same level as the mercury in the reservoir, and being in balance, the valve 12 is closed again to make the instrument ready for use.

It will be understood from the foregoing, that up to now the pump 14 has not been operated and the level of the mercury in the reservoir 4 will be the same as that of the mercury lying in the lower part of the tube 1. This position of the mercury is indicated in Fig. 2.

The tourniquet 16 may now be wrapped about the arm of the patient and the pump 14 operated to create or build up a pressure in the reservoir 4 above the mercury, thereby forcing the mercury through the convolutions of the tube 1 toward the closed end of the tube, the pump also at the same time inflating the tourniquet. It will be understood that the mercury is forced through the tube 1 in the form of a column, the plane of which is above that of the mercury in the reservoir 4. In other words, the plane of the column of the mercury after the latter enters the convolutions of the spiral is different from that of the plane of the mercury which is in the reservoir 4. The pump 14 is operated until the tourniquet 16 has been sufficiently inflated to completely constrict the flow of blood in the arm, at which time a reading may be taken. By opening the valve 20 which is in the pump tube 13, the pressure in the reservoir 4 will drop and the tourniquet 16 be deflated, the mercury now returning to its initial position again for the next operation.

It will be seen from the foregoing that I have provided a sphygmomanometer in which a column of indicating material is forced against an air cushion toward the normally closed end of a spirally wound glass tube, means being provided whereby the pressure in that part of the tube between the mercury column and the closed end of the tube may be varied to compensate for atmospheric conditions, thereby providing balancing means for the indicating material to ensure that the indicating material will always be in balance and that accurate readings may always be taken.

It will be seen also that I have provided a sphygmomanometer wherein both ends of the tube are brought to the center of the spiral, thereby conserving space, and by providing an enlarged air chamber at the normally closed end of the tube, I am enabled to space the calibrations of my improved instrument sufficiently to enable them to be easily read without, however, unduly lengthening the tube.

What I claim is:

1. A sphygmomanometer comprising a spirally wound tube having a normally closed end lying at the center of the spiral, the opposite end of the tube being bent so as to underlie the normally closed end of the tube when the tube is held with the convolutions thereof lying in a horizontal plane.

2. A sphygmomanometer comprising a spirally wound tube having a normally closed end lying substantially at the center of the spiral, the convolutions of said tube lying in the same plane, a reservoir at the opposite end of the tube and immediately underlying the normally closed end of the tube, indicating material in said reservoir, a pump attached to said reservoir for creating a pressure above the indicating material therein to force the indicating material into the convolutions of the tube in column form, and valve mechanism for initially varying the pressure in that portion of the tube lying between the indicating material and the closed end of the tube.

3. A sphygmomanometer comprising a spirally wound glass tube having a normally closed end, the normally closed end of said tube being enlarged and lying at the approximate center of the spiral, a reservoir at the opposite end of said tube, said tube intermediate the reservoir and the normally closed end of the tube being bent to bring the reservoir at the approximate center of the spiral and beneath the enlarged normally closed end of the tube, the top of said reservoir being depressed to provide a recess for receiving the normally closed end of the tube, and valve mechanism attached to the enlarged normally closed end of the tube for varying the pressure in the tube.

This specification signed this 30th day of July, 1923.

LUTHER B. MacKENZIE.